Sept. 13, 1927.                      G. E. VANCE                         1,642,096
                      RING WHEEL GRINDER AND METHOD OF MAKING SAME
                                   Filed Nov. 13, 1925
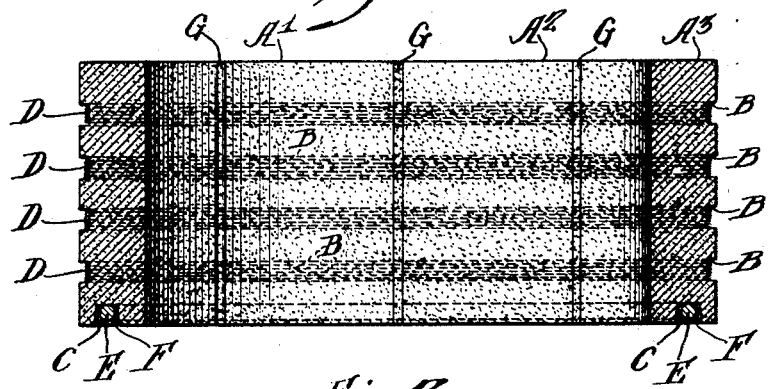
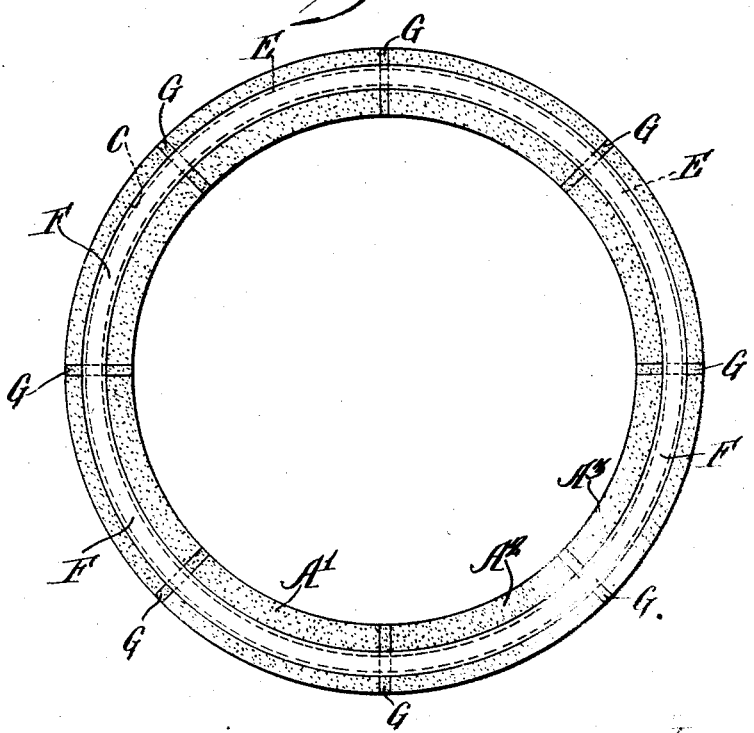
Inventor
George E. Vance
by Francis D. Chambers
his Attorney Patented Sept. 13, 1927.

1,642,096

UNITED STATES PATENT OFFICE.

GEORGE E. VANCE, OF SPRINGFIELD, OHIO.

RING WHEEL GRINDER AND METHOD OF MAKING SAME.

Application filed November 13, 1925. Serial No. 68,831.

My invention relates to ring wheel grinders and has for its object to provide a ring grinder made up of a series of assembled segments and in which the segments will be firmly secured together by means adapted to resist the strains tending to displace the segments which occur in use.

Further objects are to form such a ring grinder so that it will fit in the usual holding chucks and to so construct it as to provide what is in effect a clearance between the segments. The nature of my invention will be best understood as described in connection with the drawings, in which:

Figure 1 is a side elevation of a ring grinder constructed in accordance with my invention and Figure 2 is an end view of the grinder showing its lower end.

My ring grinder is made up of a series of segments A, A¹, A², etc. which are formed with peripheral grooves B, B, etc. assembled into ring or cylinder form as shown and secured together by metal clamps D, D, etc. which are conveniently wire windings, and which lie in the grooves B below the periphery of the assembled ring. By preference I assemble the segments with spacing pieces G, G, etc. between their lateral ends which spacing pieces are of a material more yielding than that of the segments so that in use a clearance space is provided between the segments.

To further strengthen the assembled ring I prefer to form the segments with grooves C at their rear ends which form an annular groove in the ring and in this groove I secure a metal ring E by cementing it in place by sulphur or some suitable cement as indicated at F.

In forming my grinding ring the segments, which are somewhat irregular in form as produced are formed with the peripheral grooves B, and the end grooves C if the base ring is to be used, the segments are assembled and firmly secured together by the clamping rings in the grooves and then the ring is dressed to true cylindrical form. In this way I secure a segmental grinding ring adapted to fit in the usual holding chucks and of necessary strength to resist strains tending to displace the segments.

Ring wheel grinders of the type to which my grinder belongs are worn away at their exposed ends and by providing as I do a series of metal clamps held in grooves located between the ends of the grinder I provide for the rigid holding together of the segment as the grinder is worn away and the upper clamps removed, as they must be when the grinder is worn to the level of the grooves containing the clamps. The base ring E not only aids in clamping the segments together but affords a base for the adjusting means contained in the chuck which holds the grinder and counteracts any tendency to move individual segments longitudinally.

Having now described my invention, what I claim as new and desire to secure by Letters Patent is:

1. A ring wheel grinder comprising in combination a series of segments assembled in ring form with a series of peripheral grooves formed in the cylindrical outer surface of the composite ring at points between its ends and metallic clamping rings located in said grooves below the surface of the cylinder.

2. The ring wheel grinder as claimed in claim 1, having spacing pieces between adjacent segments of different material than the segments.

3. The ring wheel grinder as claimed in claim 1 further characterized by having an annular groove formed in one end of the composite ring wheel and by having a metal ring located and secured in said end groove.

GEORGE E. VANCE.